(12) United States Patent
Kim (10) Patent No.: US 7,397,161 B2
(45) Date of Patent: Jul. 8, 2008

(54) OUTER CORE ASSEMBLY STRUCTURE OF LINEAR MOTOR

(75) Inventor: Jin Dong Kim, Kunpo-si (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 11/221,927

(22) Filed: Sep. 9, 2005

(65) Prior Publication Data

US 2006/0250031 A1 Nov. 9, 2006

(30) Foreign Application Priority Data

May 6, 2005 (KR) .................... 10-2005-0037960

(51) Int. Cl.
*H02K 1/14* (2006.01)
*H02K 33/00* (2006.01)
*H02K 33/16* (2006.01)

(52) U.S. Cl. .................... 310/216; 310/12; 310/14; 310/15

(58) Field of Classification Search .................... 310/12, 310/15, 14, 216; 29/602.1, 605–606, 609; 336/212, 216, 217, 233
See application file for complete search history.

(56) References Cited

U.S. PATENT DOCUMENTS

| 4,827,163 | A | * | 5/1989 | Bhate et al. | .................... | 310/15 |
|---|---|---|---|---|---|---|
| 5,175,457 | A | * | 12/1992 | Vincent | .................... | 310/15 |
| 6,060,810 | A | * | 5/2000 | Lee et al. | .................... | 310/254 |
| 6,573,624 | B2 | * | 6/2003 | Park | .................... | 310/12 |
| 6,668,444 | B2 | * | 12/2003 | Ngo et al. | .................... | 29/606 |
| 6,833,637 | B2 | * | 12/2004 | Park et al. | .................... | 310/12 |
| 6,858,954 | B2 | * | 2/2005 | Kwon et al. | .................... | 310/15 |
| 6,956,315 | B2 | * | 10/2005 | Yoon et al. | .................... | 310/254 |

FOREIGN PATENT DOCUMENTS

JP 03198308 A * 8/1991

* cited by examiner

*Primary Examiner*—Tran Nguyen
(74) *Attorney, Agent, or Firm*—Birch, Stewart, Kolasch & Birch, LLP (57) ABSTRACT

Disclosed herein is an outer core assembly structure of a linear motor. At least one of a plurality of core sheets is an extended core sheet having a length greater than that of the other core sheets. Consequently, easy and convenient alignment of first and second outer core blocks is accomplished when the first and second outer core blocks are assembled, and the first and second outer core blocks are securely fixed to each other. Furthermore, an additional reinforcing cover is not necessary. Consequently, assembly of the first and second outer core blocks is easily and conveniently accomplished, and therefore, the assembly costs are reduced.

19 Claims, 7 Drawing Sheets

OUTER CORE ASSEMBLY STRUCTURE OF LINEAR MOTOR

BACKGROUND OF THE INVENTION

1. Field of the Invention

The present invention relates to a linear motor, and, more particularly, to an outer core assembly structure of a linear motor wherein at least one of a plurality of core sheets is an extended core sheet having a length greater than that of the other core sheets, whereby easy and convenient alignment of first and second outer core blocks is accomplished when the first and second outer core blocks are assembled, and therefore, the first and second outer core blocks are securely fixed to each other.

2. Description of the Related Art

Generally, a linear compressor is an apparatus that introduces, compresses, and discharges refrigerant gas (hereinafter, referred to as "fluid") through a linear reciprocating movement of a piston in a cylinder, which is performed by a linear driving force of a linear motor.

Figure 1:
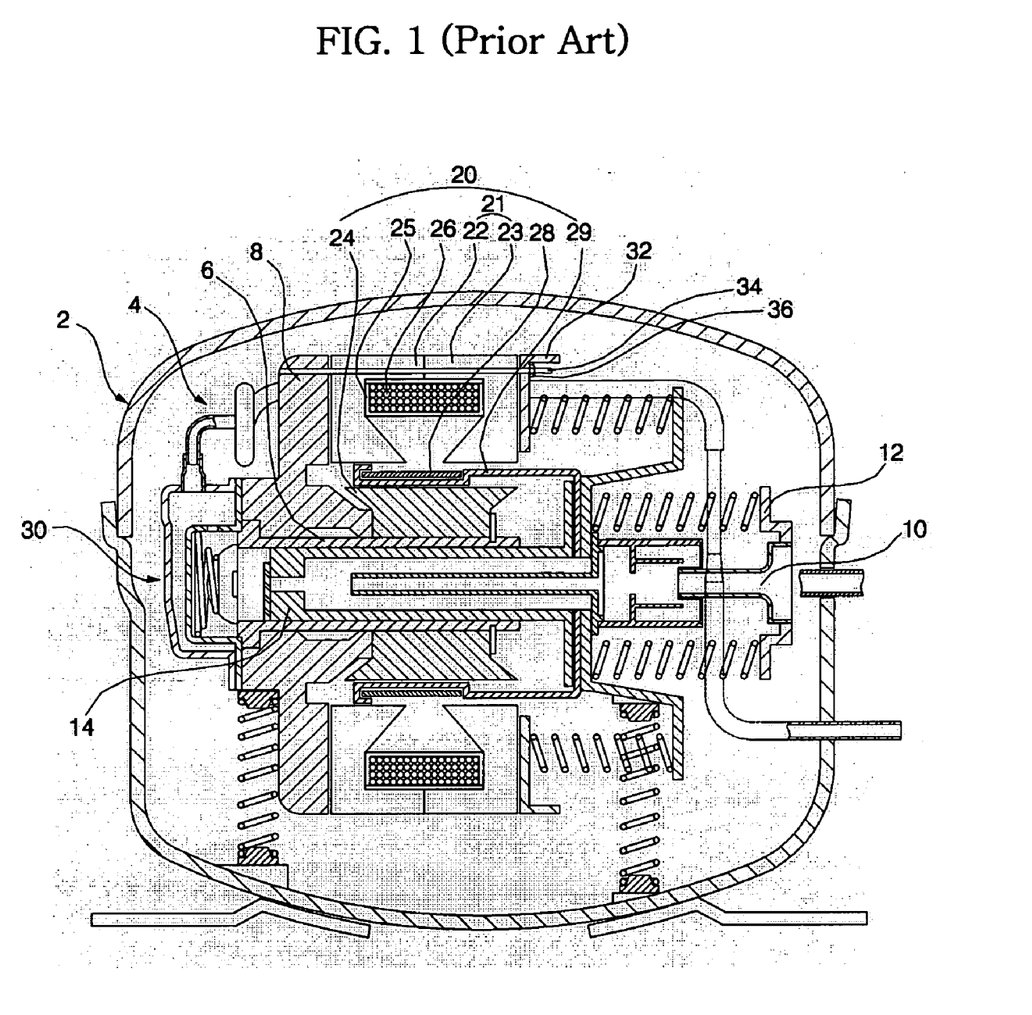
FIG. 1 is a longitudinal sectional view illustrating a linear compressor with a conventional linear motor mounted therein.
Figure 2:
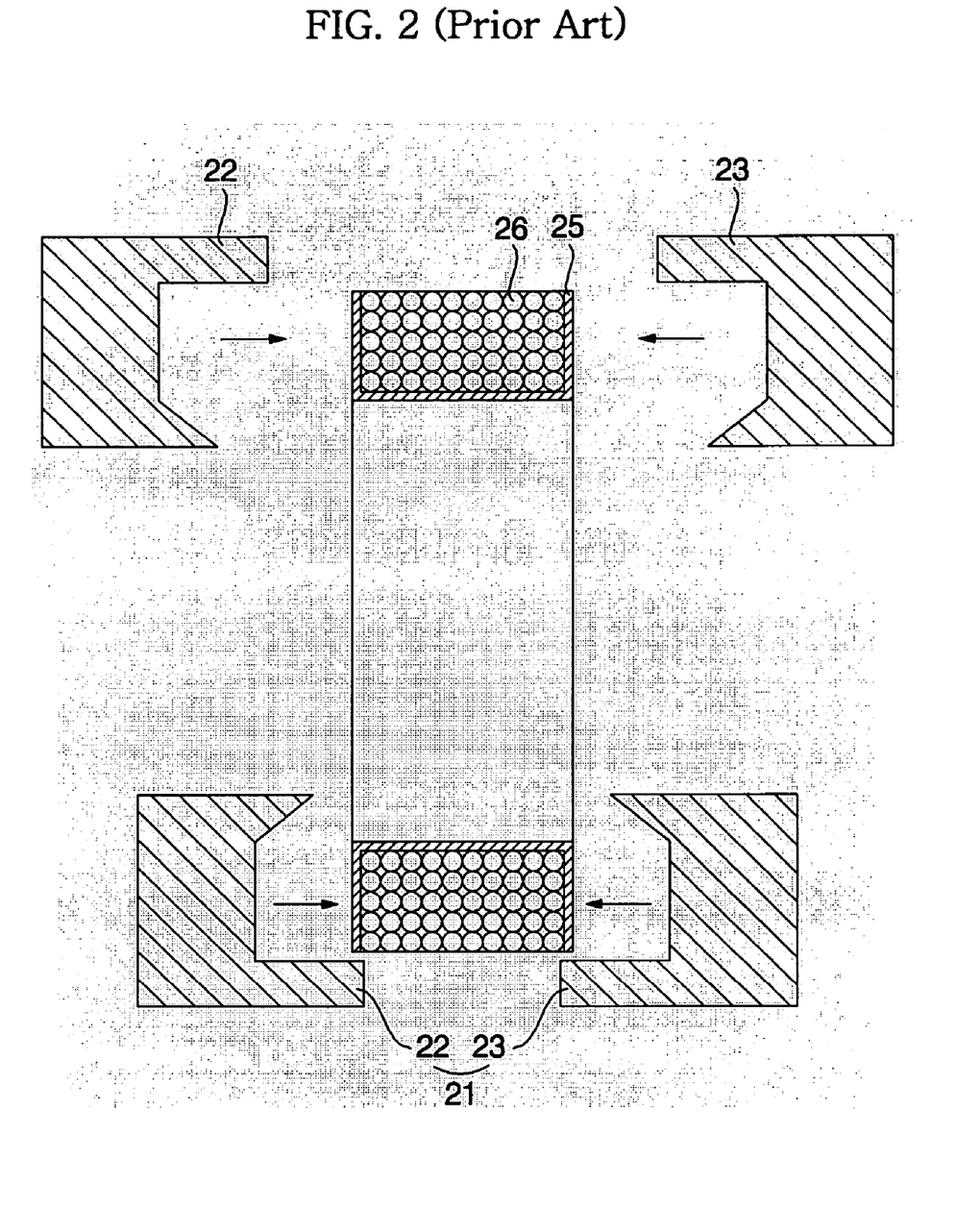
FIG. 2 is a sectional view schematically illustrating assembly of a conventional outer core and a bobbin.
Figure 3:
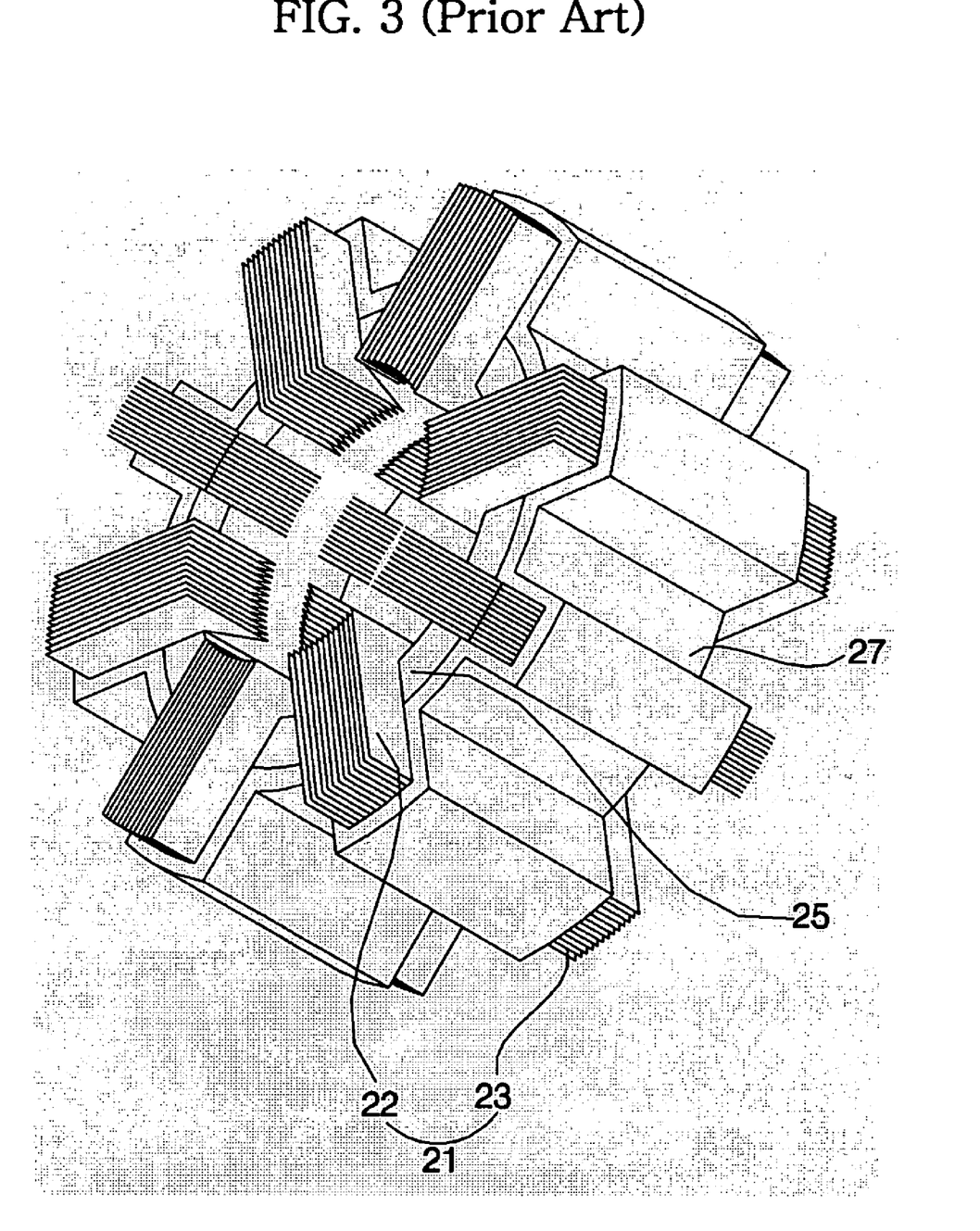
FIG. 3 is an enlarged perspective view illustrating conventional outer cores assembled to the bobbin.

FIG. 1 is a longitudinal sectional view illustrating a linear compressor with a conventional linear motor mounted therein, FIG. 2 is a sectional view schematically illustrating assembly of a conventional outer core and a bobbin, and FIG. 3 is an enlarged perspective view illustrating conventional outer cores assembled to the bobbin;

Referring to FIG. 1, the linear compressor comprises: a shell 2; and a linear compression unit 4 disposed in the shell 2 for compressing fluid.

The linear compression unit 4 comprises: a cylinder block 8 having a cylinder 6; a back cover 12 having a fluid inlet port 10; a piston 14 disposed such that the piston 14 performs a linear reciprocating movement in the cylinder 6; a linear motor 20 for generating a driving force necessary for the piston 14 to perform the linear reciprocating movement in the cylinder 6; an outlet valve assembly 30 disposed in the front of the cylinder 6 for discharging the fluid compressed in the cylinder 6.

As shown in FIGS. 1 to 3, the linear motor 20 comprises a stator and a mover.

The stator comprises: a plurality of outer cores 21; an inner core 24 disposed while being spaced a predetermined gap from the outer cores 21; a bobbin 25 mounted at the outer cores 21; and a coil 26 wound on the bobbin 25 for creating a magnetic field.

Each of the outer cores 21 comprises: a first outer core block 22, which is formed of a plurality of stacked core sheets; and a second outer core block 23, which is formed of a plurality of stacked core sheets. The first and second outer core blocks 22 and 23 are opposite to each other while being in contact with each other.

The outer cores 21 are disposed at the outer circumferential surface of the bobbin 25 at predetermined intervals in the circumferential direction.

On the outer circumferential surface of the bobbin 25 and the outer circumferential surface of the outer cores 21 is disposed a reinforcing member 27 for securely fixing the first and second outer core blocks 22 and 23 and reinforcing their rigidity. Preferably, the reinforcing member 27 is disposed on the outer circumferential surface of the bobbin 25 and the outer circumferential surface of the outer cores 21 by overmolding.

The mover comprises: a magnet 28 disposed between the outer cores 21 and the inner core 24 while being spaced a predetermined gap from the outer cores 21 and the inner core 24; and a magnet frame 29, to which the magnet 28 is securely fixed.

Meanwhile, the cylinder block 8 is disposed in front of the linear motor 20, and a stator cover 32 is disposed at the rear of the linear motor 20 for securely fixing the outer cores 21.

The cylinder block 8 and the stator cover 32 are securely connected to each other in the axial direction by means of bolts 34 and nuts 36 such that an axial compression force is applied to the outer cores 21.

Now, the operation of the linear compressor having the conventional liner motor with the above-stated construction will be described.

When electric voltage is applied to the coil 26, a magnetic force is created around the coil 26, by which the magnet 28 performs a linear reciprocating movement. The linear reciprocating movement is transmitted to the piston 14 via the magnet 28. As a result, the piston 14 performs a linear reciprocating movement in the cylinder 6.

As the piston 14 performs a linear reciprocating movement in the cylinder 6, fluid is introduced into the cylinder 6 from the shell 2 through the fluid inlet port 10 of the back cover 12. The fluid introduced into the cylinder 6 is compressed by the piston 14, and is then discharged out of the shell 2 through the outlet valve assembly 30.

However, the conventional linear motor has the following problems. When the first and second outer core blocks 22 and 23 are connected to each other, the front and rear surfaces of the first and second outer core blocks 22 and 23 are not placed on the same lines, respectively. As a result, the first and second outer core blocks 22 and 23 are not placed at proper positions, respectively. In other words, the first and second outer core blocks 22 and 23 are not aligned with each other. Consequently, stable connection of the first and second outer core blocks is not accomplished.

Furthermore, the reinforcing member 27 is disposed on the outer circumferential surfaces of the first and second outer core blocks 22 and 23 and the outer circumferential surface of the bobbin 25. The manufacturing process of the reinforcing member 27 is very complicated, and quality control of the reinforcing member is difficult. As a result, the manufacturing costs of the linear motor are increased.

SUMMARY OF THE INVENTION

Therefore, the present invention has been made in view of the above problems, and it is an object of the present invention to provide an outer core assembly structure of a linear motor wherein assembly of the outer core is easily and conveniently accomplished, and therefore, the assembly costs are reduced.

In accordance with the present invention, the above and other objects can be accomplished by the provision of an outer core assembly structure of a linear motor, comprising: at least one outer core, the at least one outer core including first and second outer core blocks opposite to each other, the first and second outer core blocks being composed of a plurality of stacked core sheets, respectively; and a coil mounted at the at least one outer core, wherein at least one of the core sheets is an extended core sheet having a length greater than that of the other core sheets.

Preferably, the extended core sheet is stacked on the outermost side of the core sheets.

Preferably, the extended core sheet comprises: a first extended core sheet constituting the first outer core block; and a second extended core sheet constituting the second outer core block.

Preferably, the first extended core sheet is disposed at one of the front and rear surfaces of the at least one outer core, and the second extended core sheet is disposed at the other surface of the at least one outer core.

Preferably, at least one of the core sheets is a reduced core sheet having a length less than that of the other core sheets.

Preferably, the reduced core sheet has a reduced length portion equal to an extended length portion of the extended core sheet such that the end of the reduced core sheet is brought into contact with the corresponding end of the extended core sheet.

Preferably, the reduced core sheet comprises: a first reduced core sheet constituting the first outer core block, the first reduced core sheet corresponding to the second extended core sheet; and a second reduced core sheet constituting the second outer core block, the second reduced core sheet corresponding to the first extended core sheet.

Preferably, the outer core assembly structure further comprises: a cylinder block disposed in front of the linear motor, the cylinder block having a cylinder; and a stator cover disposed at the rear of the linear motor for securely fixing the at least one outer core.

Preferably, the cylinder block and the stator cover are securely connected to each other in the axial direction by means of fixing members such that an axial compression force is applied to the at least one outer core.

Preferably, the outer core assembly structure further comprises: a bobbin, on which the coil is wound, wherein the at least one outer core comprises a plurality of outer cores radially disposed along the bobbin.

According to the present invention, at least one of the core sheets is an extended core sheet having a length greater than that of the other core sheets. Consequently, easy and convenient alignment of the first and second outer core blocks is accomplished when the first and second outer core blocks are assembled, and the first and second outer core blocks are securely fixed to each other. Furthermore, an additional reinforcing cover is not necessary. Consequently, assembly of the first and second outer core blocks is easily and conveniently accomplished, and therefore, the assembly costs are reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 4:
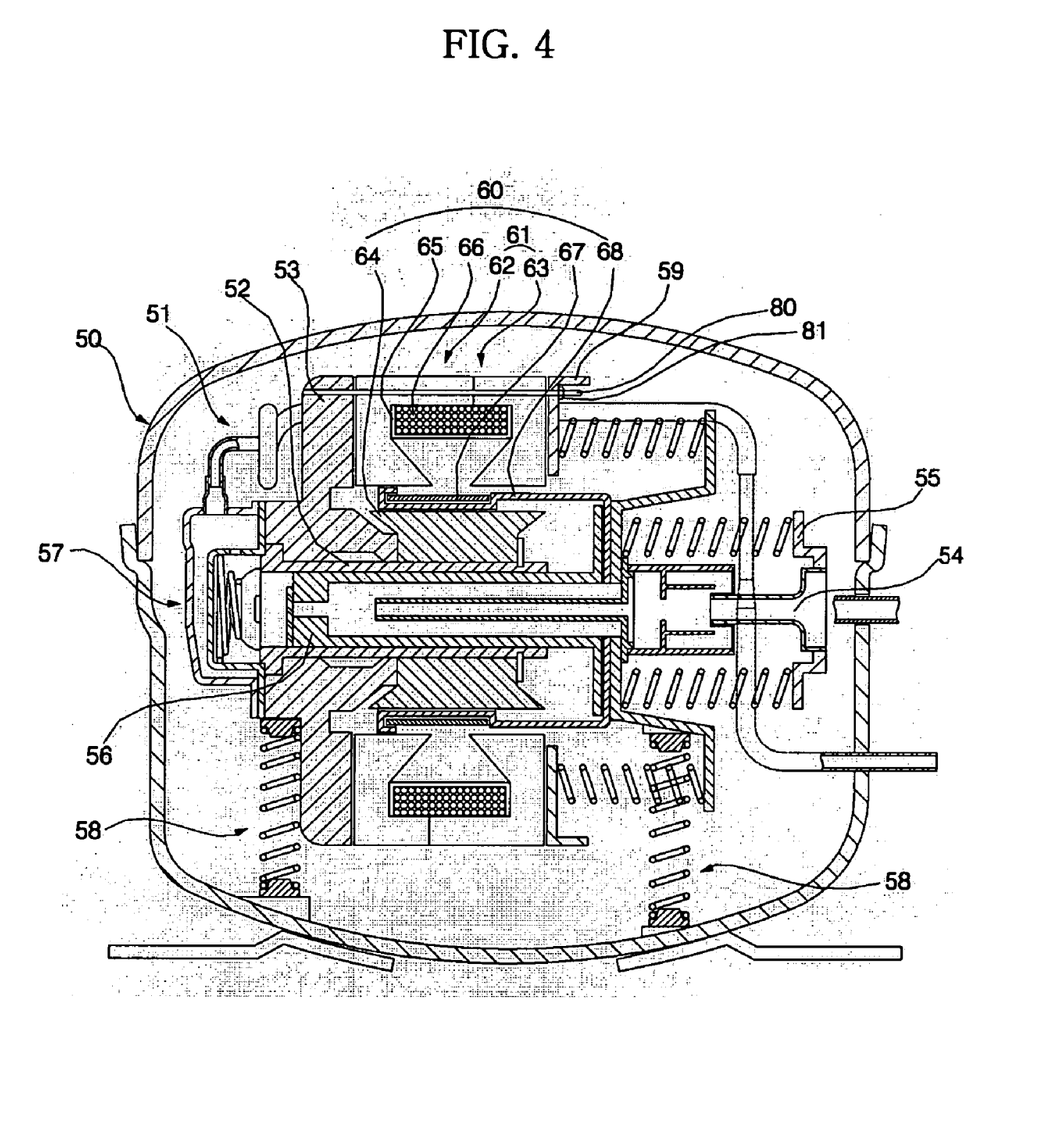
FIG. 4 is a longitudinal sectional view illustrating a linear compressor with a linear motor according to the present invention mounted therein.
Figure 5:
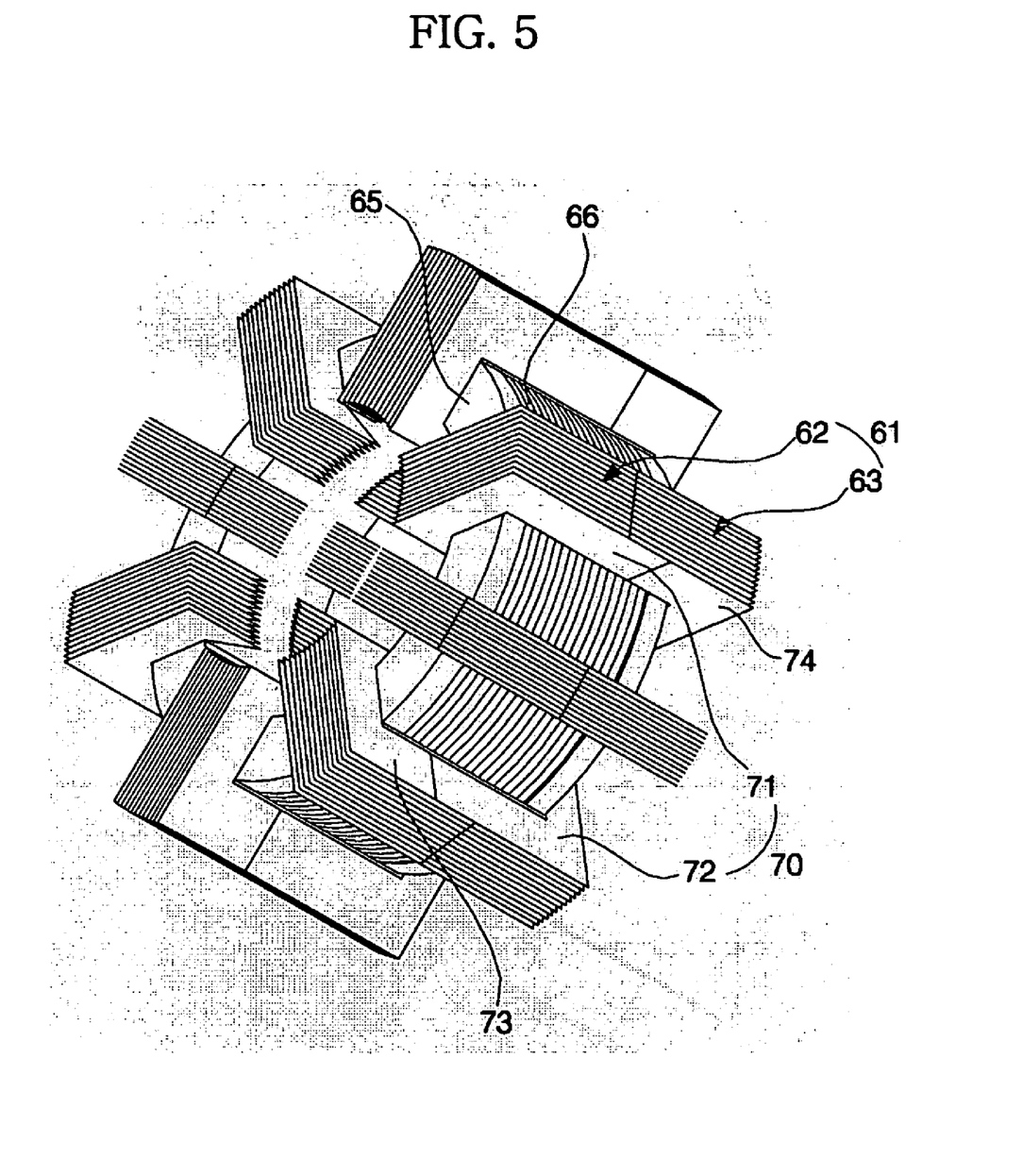
FIG. 5 is an enlarged perspective view illustrating outer cores according to the present invention, which are assembled to a bobbin.
Figure 6:
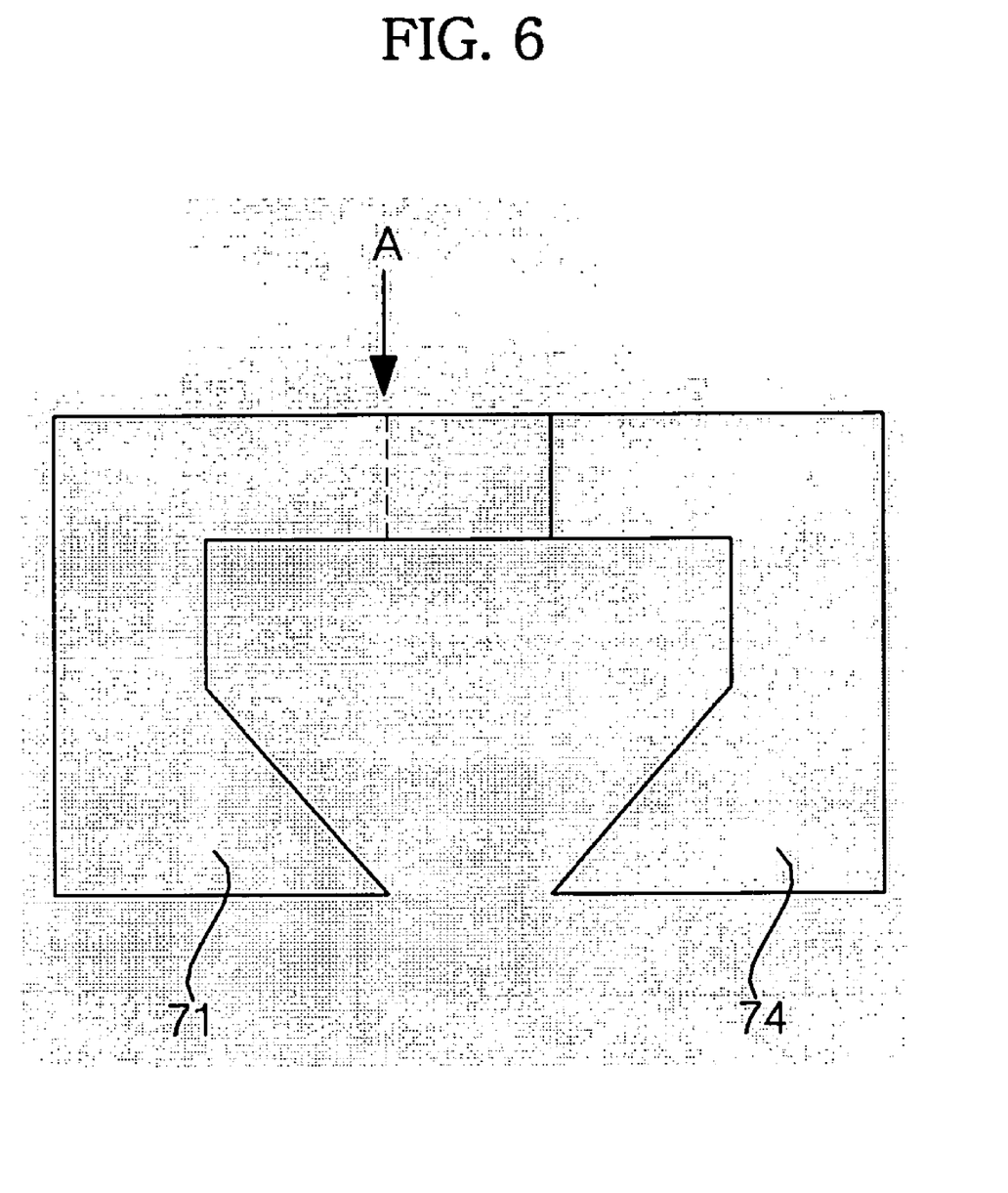
FIG. 6 is a front view illustrating an outer core according to the present invention.
Figure 7:
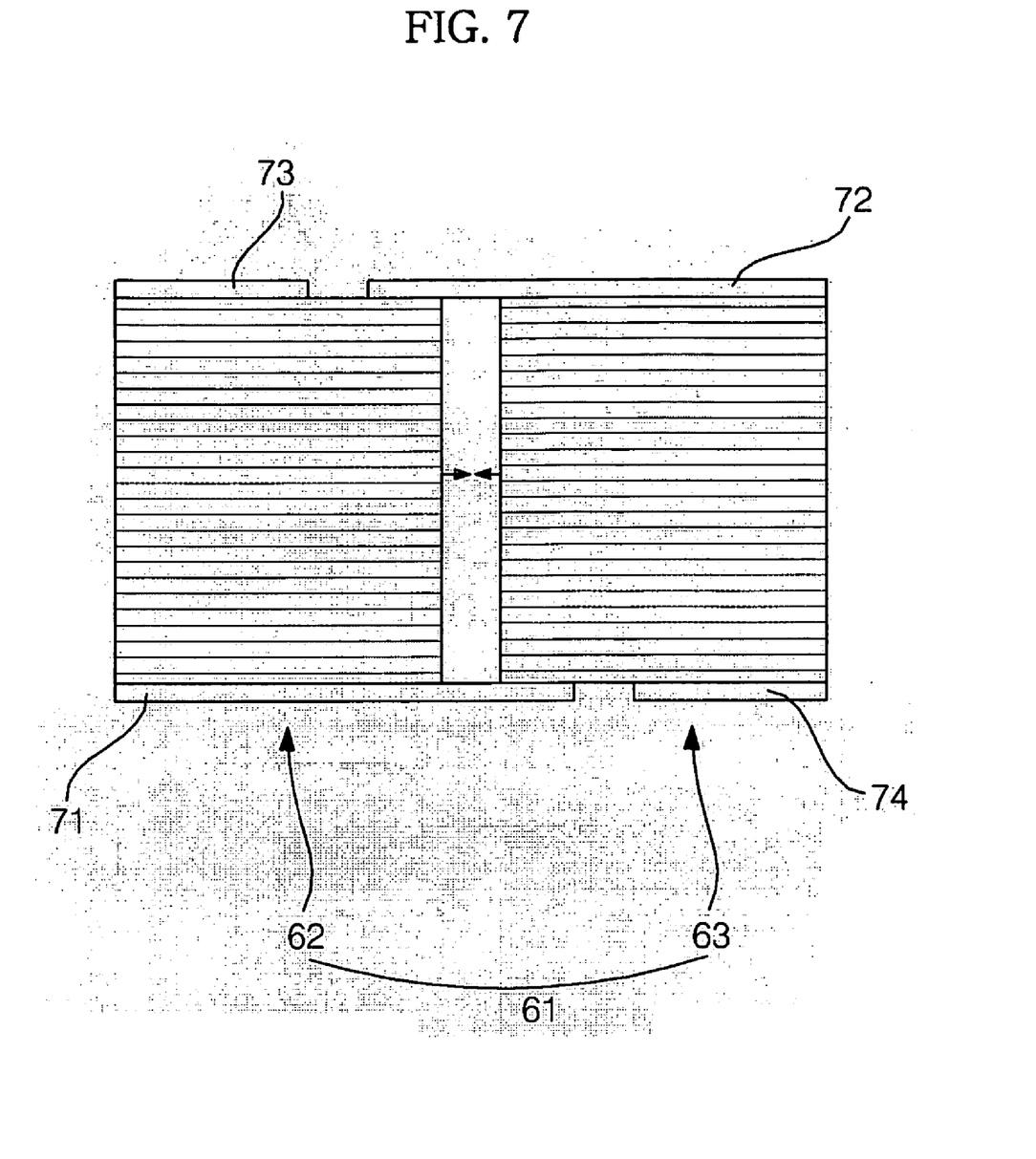
FIG. 7 is a plan view of the outer core seen from the direction indicated by the arrow A in FIG. 6.

FIG. 4 is a longitudinal sectional view illustrating a linear compressor with a linear motor according to the present invention mounted therein, FIG. 5 is an enlarged perspective view illustrating outer cores according to the present invention, which are assembled to a bobbin, FIG. 6 is a front view illustrating an outer core according to the present invention, and FIG. 7 is a plan view of the outer core seen from the direction indicated by the arrow A in FIG. 6.

Referring to FIG. 4, the linear compressor with the liner motor according to the present invention mounted therein comprises: a shell 50; and a linear compression unit 51 disposed in the shell 50 for compressing fluid.

The linear compression unit 51 comprises: a cylinder block 53 having a cylinder 52; a back cover 55 having a fluid inlet port 54; a piston 56 disposed such that the piston 56 performs a linear reciprocating movement in the cylinder 52; a linear motor 60 for generating a driving force necessary for the piston 56 to perform the linear reciprocating movement in the cylinder 52; an outlet valve assembly 57 disposed in the front of the cylinder 52 for discharging the fluid compressed in the cylinder 52.

The cylinder block 53 and the back cover 55 is supported by a damper 58 mounted at the inner lower part of the shell 50 in a shock-absorbing fashion.

The linear motor 60 comprises a stator and a mover.

The stator comprises: a plurality of outer cores 61; an inner core 64 disposed while being spaced a predetermined gap from the outer cores 61; a bobbin 65 mounted at the outer cores 61; and a coil 66 wound on the bobbin 65 for creating a magnetic field. The mover comprises: a magnet 67 disposed between the outer cores 61 and the inner core 64; and a magnet frame 68, to which the magnet 67 is securely fixed.

The outer cores 61 are disposed at the outer circumferential surface of the bobbin 65 at predetermined intervals in the circumferential direction.

Each of the outer cores 61 comprises first and second outer core blocks 62 and 63, which are opposite to each other while being in contact with each other.

The first outer core block 62 is composed of a plurality of stacked steel core sheets. The stacked steel core sheets are securely attached to one another such that the first outer core block 62 is formed in the shape of a block. Similarly, the second outer core block 63 is composed of a plurality of stacked steel core sheets. The stacked steel core sheets are securely attached to one another such that the second outer core block 63 is formed in the shape of a block.

At least one of the core sheets is an extended core sheet 70 having a length greater than that of the other core sheets.

Preferably, the extended core sheet 70 is stacked on the outermost side of the core sheets.

The extended core sheet 70 may be included in either the first outer core block 62 or the second outer core block 63. In the following description, however, the extended core sheet 70 is included in the first outer core block 62 as well as the second outer core block 63.

Specifically, the extended core sheet 70 comprises: a first extended core sheet 71 constituting the first outer core block 62; and a second extended core sheet 72 constituting the second outer core block 63.

Preferably, the first extended core sheet 71 is disposed at one of the front and rear surfaces of each of the outer cores 61, and the second extended core sheet 72 is disposed at the other surface of each of the outer cores 61. In the following description, the first extended core sheet 71 is disposed at the front surface of each of the outer cores 61, and the second extended core sheet 72 is disposed at the rear surface of each of the outer cores 61.

Consequently, the first extended core sheet 71 is brought into contact with a portion of the front surface of the second outer core block 63. At least one of the core sheets constituting the second outer core block 63 is a second reduced core sheet 74 having a length less than that of the other core sheets. The second reduced core sheet 74 corresponds to the first extended core sheet 71.

Specifically, the reduced length portion of the second reduced core sheet 74 is equal to the extended length portion of the first extended core sheet 71, as shown in FIG. 7, such that the end of the second reduced core sheet 74 is brought into contact with the corresponding end of the first extended core sheet 71.

Also, the second extended core sheet 72 is brought into contact with a portion of the rear surface of the first outer core block 62. At least one of the core sheets constituting the first outer core block 62 is a first reduced core sheet 73 having a length less than that of the other core sheets. The first reduced core sheet 73 corresponds to the second extended core sheet 72.

Specifically, the reduced length portion of the first reduced core sheet 73 is equal to the extended length portion of the second extended core sheet 72 such that the end of the first reduced core sheet 73 is brought into contact with the corresponding end of the second extended core sheet 72.

Meanwhile, the cylinder block 53 is disposed in front of the linear motor 60, and a stator cover 59 is disposed at the rear of the linear motor 60 for securely fixing the outer cores 61.

The cylinder block 53 and the stator cover 59 are securely connected to each other in the axial direction by means of bolts 80 and nuts 81 such that an axial compression force is applied to the outer cores 61.

The assembly of the outer cores of the linear motor with the above-stated construction according to the present invention will be described hereinafter in detail.

First, a plurality of core sheets are stacked, and the stacked core sheets are securely united to form the first and second side core blocks 62 and 63.

The first extended core sheet 71 is disposed at the front surface of the first outer core block 62, and the first reduced core sheet 73 is disposed at the rear surface of the first outer core block 62.

Similarly, the second reduced core sheet 74 is disposed at the front surface of the second outer core block 63, and the second extended core sheet 72 is disposed at the rear surface of the second outer core block 62.

The first and second outer core blocks 62 and 63 are arranged side by side such that the first and second outer core blocks 62 and 63 are opposite to each other while being in contact with each other. As a result, the first extended core sheet 71 is brought into contact with a portion of the front surface of the second outer core block 63, and the second extended core sheet 72 is brought into contact with a portion of the rear surface of the first outer core block 62.

Consequently, when the first and second outer core blocks 62 and 63 are assembled, as shown in FIG. 7, the first and second outer core blocks 62 and 63 are properly placed at their assembly positions by means of the first and second extended core sheets 71 and 72. Furthermore, misalignment of the first and second outer core blocks 62 and 63 is prevented, and therefore, stable connection of the first and second outer core blocks 62 and 63 is accomplished. In this way, each of the outer cores 61 is prepared.

Subsequently, the outer cores 61 are radially disposed along the bobbin 65, on which the coil 66 is wound.

The cylinder block 53 and the stator cover 59 are disposed at the opposite sides of the respective outer cores 61, and the cylinder block 53 and the stator cover 59 are securely connected to each other in the axial direction by means of the bolts 80 and the nuts 81.

As a result, an axial compression force is applied to the outer cores 61. At this time, the relative movement of the first and second outer core blocks 62 and 63 in the forward and rearward direction is effectively prevented by the first and second extended core sheets 71 and 72. Consequently, the first and second outer core blocks 62 and 63 are securely fixed to each other without the provision of an additional reinforcing cover.

As apparent from the above description, the present invention provides an outer core assembly structure of a linear motor wherein at least one of a plurality of core sheets is an extended core sheet having a length greater than that of the other core sheets. Consequently, easy and convenient alignment of first and second outer core blocks is accomplished when the first and second outer core blocks are assembled, and the first and second outer core blocks are securely fixed to each other. Furthermore, an additional reinforcing cover is not necessary. Consequently, assembly of the first and second outer core blocks is easily and conveniently accomplished, and therefore, the assembly costs are reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An outer core assembly structure of a linear motor, comprising:
    at least one outer core, the at least one outer core including first and second outer core blocks opposite to each other, the first and second outer core blocks being composed of a plurality of stacked core sheets, respectively; and
    a coil mounted at the at least one outer core, wherein
    at least one of the core sheets positioned on outermost sides of one of the outer core block is an extended core sheet having a length greater than that of remaining core sheets of the one of the outer core blocks,
    wherein the core sheets except the core sheets positioned on the outermost sides of the one of the outer core blocks have a same length.

2. The outer core assembly structure as set forth in claim 1, wherein the extended core sheet comprises:
    a first extended core sheet constituting one of the stacked core sheets of the first outer core block; and
    a second extended core sheet constituting one of the stacked core sheets of the second outer core block.

3. The outer core assembly structure as set forth in claim 2, wherein
    the first extended core sheet is disposed at one of the front and rear surfaces of the at least one outer core, and
    the second extended core sheet is disposed at the other surface of the at least one outer core.

4. The outer core assembly structure as set forth in claim 3, wherein at least one of the core sheets is a reduced core sheet having a length less than that of the other core sheets.

5. The outer core assembly structure as set forth in claim 4, wherein the reduced core sheet has a reduced length portion equal to an extended length portion of the extended core sheet such that the end of the reduced core sheet is brought into contact with the corresponding end of the extended core sheet.

6. The outer core assembly structure as set forth in claim 5, wherein the reduced core sheet comprises:
    a first reduced core sheet constituting one of the stacked core sheets of the first outer core block, the first reduced core sheet corresponding to the second extended core sheet; and
    a second reduced core sheet constituting one of the stacked core sheets of the second outer core block, the second reduced core sheet corresponding to the first extended core sheet.

7. The outer core assembly structure as set forth in claim 6, wherein
    a cylinder block is disposed in front of the linear motor, the cylinder block having a cylinder, and
    a stator cover is disposed at the rear of the linear motor for securely fixing the at least one outer core.

8. The outer core assembly structure as set forth in claim 7, wherein the cylinder block and the stator cover are securely connected to each other in the axial direction by means of fixing members such that an axial compression force is applied to the at least one outer core.

9. The outer core assembly structure as set forth in claim 8, further comprising:
    a bobbin, on which the coil is wound, wherein
    the at least one outer core comprises a plurality of outer cores radially disposed along the bobbin.

10. An outer core assembly structure of a linear motor, comprising:
    at least one outer core, the at least one outer core including first and second outer core blocks opposite to each other, the first and second outer core blocks being composed of a plurality of stacked core sheets, respectively; and
    a coil mounted at the at least one outer core, wherein
    at least one of the core sheets positioned on outermost sides of the outer core blocks is an extended core sheet having a length greater than that of the other core sheets, and
    another one of the core sheets positioned on the outermost sides of the outer core blocks is a reduced core sheet having a length less than that of the other core sheets, wherein the other core sheets have a same length.

11. The outer core assembly structure as set forth in claim 10, wherein
    the extended core sheet constitutes one of the stacked core sheets in one of the first and second outer core blocks, and
    the reduced core sheet constitutes one of the stacked core sheets in the other of the first and second outer core blocks.

12. The outer core assembly structure as set forth in claim 11, wherein the extended core sheet and the reduced core sheet are arranged such that the end of the extended core sheet is brought into contact with the corresponding end of the reduced core sheet.

13. The outer core assembly structure as set forth in claim 12, wherein the reduced core sheet has a reduced length portion equal to an extended length portion of the extended core sheet.

14. The outer core assembly structure as set forth in claim 13, wherein
    a cylinder block is disposed in front of the linear motor, the cylinder block having a cylinder, and
    a stator cover is disposed at the rear of the linear motor for securely fixing the at least one outer core.

15. The outer core assembly structure as set forth in claim 14, wherein the cylinder block and the stator cover are securely connected to each other in the axial direction by means of fixing members such that an axial compression force is applied to the at least one outer core.

16. An outer core assembly structure of a linear motor, comprising:
    a plurality of outer cores, each of the outer cores including first and second outer core blocks opposite to each other, the first and second outer core blocks being composed of a plurality of stacked core sheets, respectively;
    an inner core disposed while being spaced a predetermined gap from the outer cores;
    a bobbin, at which the outer cores are radially disposed; and
    a coil wound on the bobbin, wherein
    at least one of the core sheets positioned on outermost sides of one of the outer core blocks is an extended core sheet having a length greater than that of remaining core sheets of the one of the first and second outer core blocks, wherein the remaining core sheets except the core sheets positioned on the outermost sides of the one of the outer core blocks have a same length.

17. The outer core assembly structure as set forth in claim 16, wherein at least one of the core sheets is a reduced core sheet having a length less than that of the other core sheets, the reduced core sheet corresponding to the extended core sheet.

18. The outer core assembly structure as set forth in claim 17, wherein
    the extended core sheet constitutes one of the stacked core sheets in one of the first and second outer core blocks, and
    the reduced core sheet constitutes one of the stacked core sheets in the other of the first and second outer core blocks.

19. The outer core assembly structure as set forth in claim 18, wherein the reduced core sheet has a reduced length portion equal to an extended length portion of the extended core sheet such that the end of the reduced core sheet is brought into contact with the corresponding end of the extended core sheet.

* * * * *